United States Patent [19]
Oswald

[11] Patent Number: 4,841,912
[45] Date of Patent: Jun. 27, 1989

[54] ANIMAL FEEDER

[76] Inventor: Robert L. Oswald, R.R. 2 - Box 50, Shickley, Nebr. 68436

[21] Appl. No.: 109,536

[22] Filed: Oct. 19, 1987

[51] Int. Cl.$^4$ .............................................. A01K 5/00
[52] U.S. Cl. ...................................................... 119/53
[58] Field of Search .................. 119/53, 52 AF, 56 R, 119/52 B, 53.5, 54, 52 A

[56] References Cited

U.S. PATENT DOCUMENTS

| | | |
|---|---|---|
| 900,851 | 10/1908 | Hatch . |
| 905,393 | 12/1908 | Webb ...................... 119/53 |
| 1,026,859 | 5/1912 | Garrison . |
| 1,822,289 | 9/1931 | Helmers . |
| 1,910,596 | 5/1933 | Einsel et al. ............. 119/53 |
| 2,226,476 | 12/1940 | Maggart ............. 119/52 A |
| 2,515,698 | 7/1950 | Cosby ...................... 119/53 |
| 2,796,848 | 6/1957 | Zimmerman ............. 119/53 |
| 2,854,949 | 10/1958 | Wiggins ..................... 119/53 |
| 3,102,511 | 9/1963 | Atcheson ................. 119/53 |
| 3,716,172 | 2/1973 | Crippen ............ 119/52 AF X |
| 3,911,868 | 10/1975 | Brembeck ............... 119/53 |
| 4,348,988 | 9/1982 | Lawson ..................... 119/53 |
| 4,377,130 | 3/1983 | Schweiger ............. 119/51.5 |
| 4,401,057 | 8/1983 | Van Gilst ............ 119/52 AF X |
| 4,565,159 | 1/1986 | Sweeney .................. 119/53 |

FOREIGN PATENT DOCUMENTS

| | | | |
|---|---|---|---|
| 478578 | 11/1951 | Canada .................................. 119/51 |
| 75918 | 6/1953 | Denmark ............................. 119/53 |
| 1061142 | 4/1954 | France .................................. 119/53 |
| 17925 | 10/1893 | United Kingdom ................ 119/53 |

Primary Examiner—Gene Mancene
Assistant Examiner—R. Thomas Price
Attorney, Agent, or Firm—Zarley, McKee, Thomte, Voorhees & Sease

[57] ABSTRACT

An animal feeder includes a tank supported over a feed pan by a plurality of straps projecting radially inwardly from the sidewall of the feed pan. The tank has a funnel portion which directs the feed into a hollow tubular valve which is adjustable to regulate the feed flow to the pan. The tubular valve has cross beams mounted on a hub which is supported on a bearing to allow rotation and thereby agitation of the feed within the valve. A shaft with a threaded lower end corresponds with a threaded aperture in the hub and is supported on a bearing. The shaft is rotatable with respect to the hub to raise and lower the tubular valve with respect to the pan, and thereby regulate the feed flow. A sleeve which surrounds the shaft is affixed to the hub and is engagable to the shaft with a set screw so that the shaft may be engaged to rotate with the sleeve and the tubular valve, thereby allowing agitation of the feed by rotation of the valve without causing any adjustment to the feed flow rate.

6 Claims, 3 Drawing Sheets

ANIMAL FEEDER

TECHNICAL FIELD

The present invention relates generally to animal feeders, and more particularly to large capacity feeders having adjustable feed flow regulators.

BACKGROUND OF THE INVENTION

There are a wide variety of animal feeders known in the art. In general, a tank which holds the feed is raised and lowered with respect to a pan, thereby increasing or decreasing the flow of feed to the pan. However, small capacity feeders may not be simply enlarged in order to obtain large capacity feeders. The sheet weight of the feed in a large tank would make such a feeder unworkable.

For this reason, large capacity feeders are designed differently than small feeders. Conventional large capacity feeders are either of the cylindrical type or the rectangular type. Cylindrical feeders utilize a vertically movable door or ring which will allow feed to escape from the tank. However, such devices have been found to be difficult to adjust, and are unreliable in maintaining the desired flow rate. Also, such feeders do not allow the animal to agitate the feed if moisture causes bridging to occur. Rectangular feeders suffer the same problems as cylindrical feeders, and generally feed fewer animals in the same amount of space.

It is therefore a general object of the present invention to provide an improved animal feeder.

Another object of the present invention is to provide an animal feeder which will operate easily and maintain a large volume of feed.

A further object of the present invention is to provide a feeder with a feed flow control which is independent of the support of the tank.

Still another object of the present invention is to provide a feeder with an anti-bridging device operable by animals.

These and other objects will be apparent to those skilled in the art.

SUMMARY OF THE INVENTION

The animal feeder of the present invention includes a tank supported over a feed pan by a plurality of straps projecting radially inwardly from the sidewall of the feed pan. The tank has a funnel portion which directs the feed to the center of the lower opening in the tank and into a hollow tubular valve which is adjustable to regulate the feed flow to the pan. The tubular valve has cross beams mounted on a hub which is supported on a bearing to allow rotation and thereby agitation of the feed within the valve. A shaft with a threaded lower end corresponds with a threaded aperture in the hub and is supported on a bearing. The shaft is rotatable with respect to the hub to raise and lower the tubular valve with respect to the pan, and thereby regulate the feed flow. A sleeve which surrounds the shaft is affixed to the hub and is engagable to the shaft with a set screw so that the shaft may be engaged to rotate with the sleeve and the tubular valve, thereby allowing agitation of the feed by rotation of the valve without causing any adjustment to the feed flow rate. The bearing under the shaft and hub is supported on a plateau on top of a truncated conical portion and is covered by a cone insert which rests on the cross beams in the tubular valve. The conical surfaces of the cone insert and the truncated cone assists in feed flow through the valve while reducing the frictional force which would restrain the ease of rotation of the valve by the animals.

DESCRIPTION OF THE PREFERRED EMBODIMENT

Figure 1:
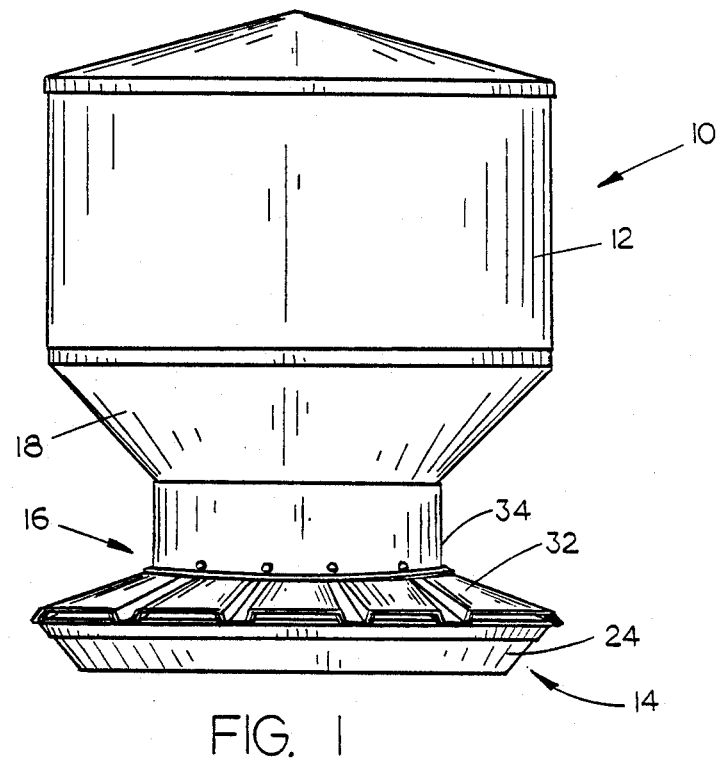
FIG. 1 is a side view of the animal feeder of this invention.
Figure 2:
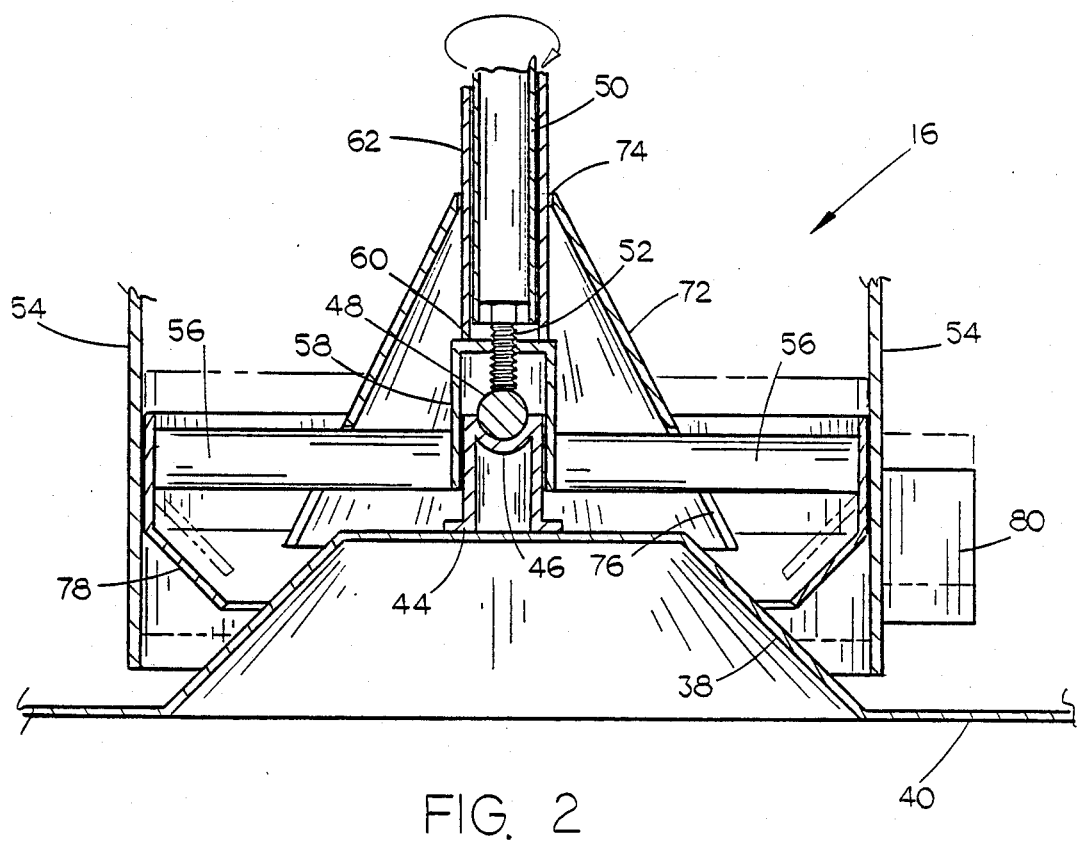
FIG. 2 is an enlarged sectional view of the feed control portion of the feeder.
Figure 3:
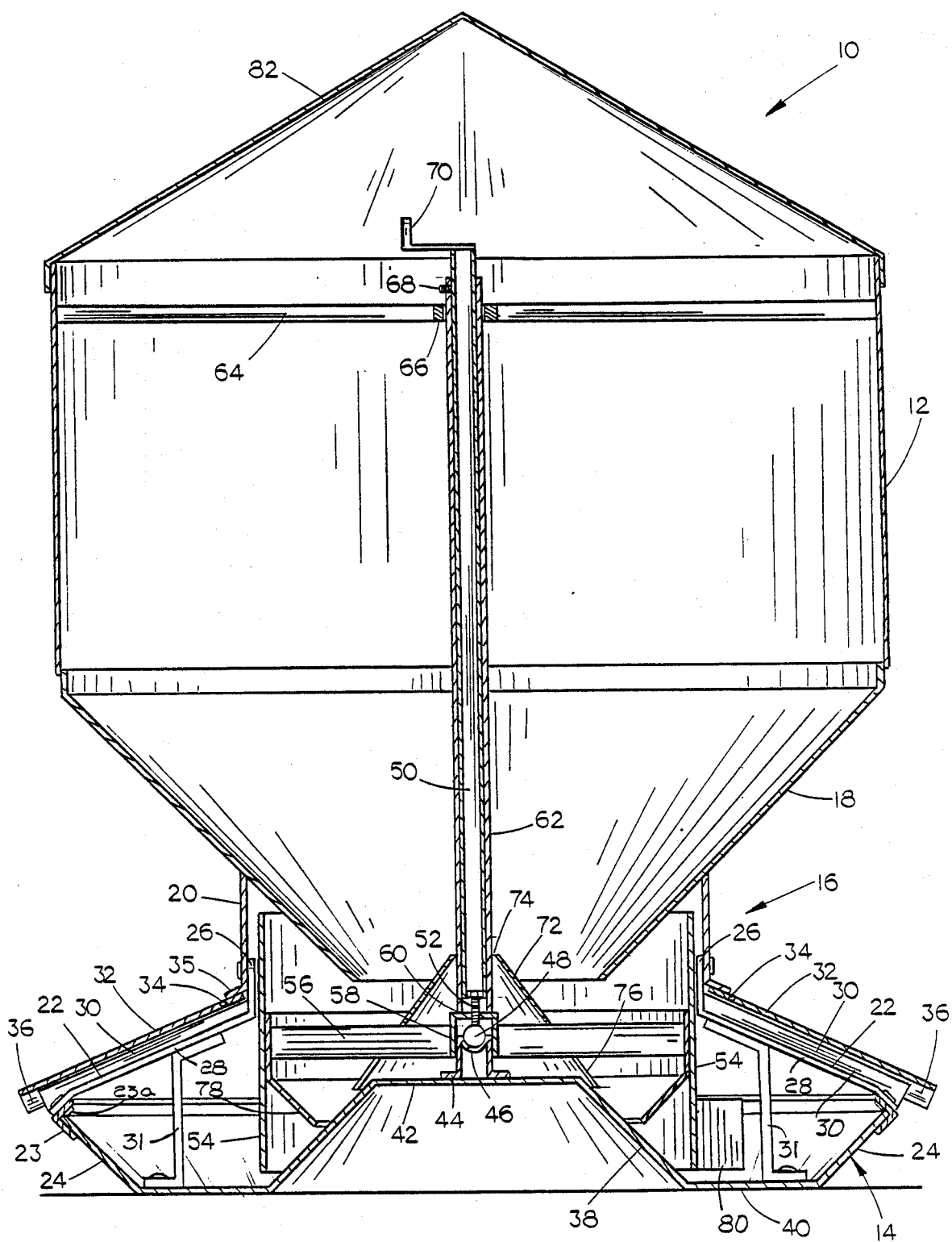
FIG. 3 is a vertical sectional view of the invention.
Figure 4:
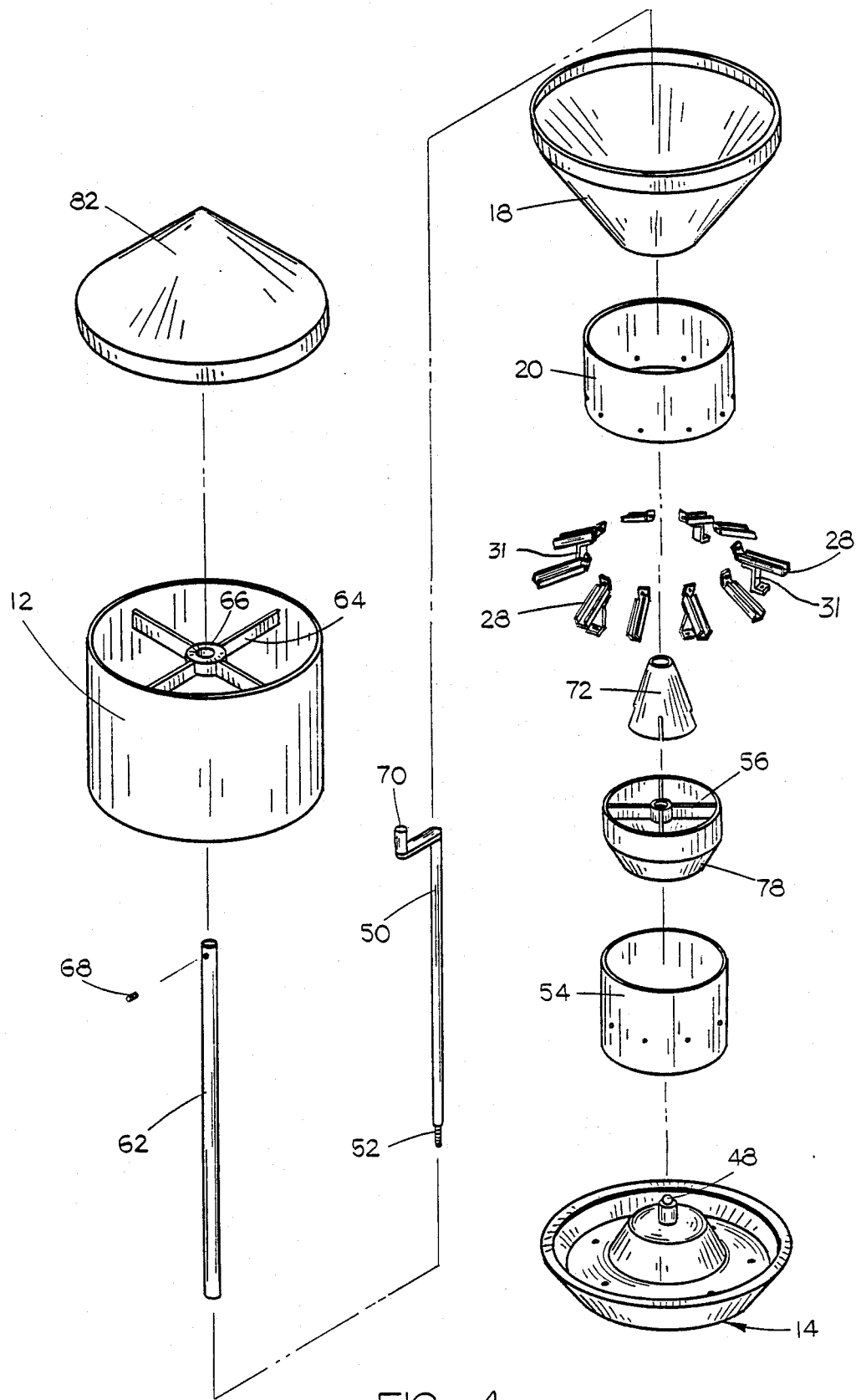
FIG. 4 is an exploded perspective view of the major components of the invention.

Referring now to the drawings in which identical or corresponding parts are represented by the same reference numeral, the animal feeder of this invention is designated generally at 10 and includes a feed tank 12, a pan 14 and a feed flow control assembly 16.

Feed tank 12 is cylindrical and open at its upper and lower ends. A funnel portion 18 is mounted in the lower end of tank 12 and directs the feed centrally into the feed flow control assembly 16. A cylindrical tank support 20 is affixed to the underside of funnel 18 and is mounted to the upper ends of a plurality of support straps 22. Straps 22 are mounted radially inwardly from an angle iron 23 mounted to the sidewall 24 of pan 14. Angle iron 23 is positioned with one leg extending inwardly to form an overhanging lip 23a which helps keep the feed in pan 14.

Straps 22 have an upper portion 26 which is bent to a vertical position and bolted to tank support 20. The body 28 of straps 22 is inclined downwardly from tank support 20 to pan sidewall 24, and has sidewalls 30 flared upwardly to form a channel which will drain away any rain water. Support members 31 are generally Z-shaped, and are mounted between straps 22 and 14 to furnish direct support to tank support 20. A support member 31 is mounted to every other strap 22, and then attached to the bottom 40 of pan 14. The number of support members 31 may be increased or decreased for feeders of different sizes and capacities.

A plurality of lids 32 are pivotally connected to tank support 20 along hinges 34, and span between straps 22. An outwardly bent lip 35 along the lower end of tank support 20 projects over hinges 34 to protect them from rain. Downwardly projecting sidewalls 37 on each lid 32 rest within the channels formed in straps 22. Thus, rain will be deflected from the feed openings between straps 22 by lids 32, into the channels on straps 22, and then off of pig feeder 10.

Pan 14 has a truncated conical center portion 38 which causes the feed to slide into the bottom 40 of pan 14. Center portion 38 has a plateau 42 on its upper end upon which a bearing support 44 is mounted. Bearing support 44 has a cup portion 46 in its upper end which holds a spherical bearing 48. A vertical shaft 50 has a threaded lower end 52 which is supported on bearing 48 and rotatable thereon.

A cylindrical hollow tube 54 (hereinafter tubular valve 54) is supported on cross beams 56 which extend radially from a center hub 58. Hub 58 is generally cylindrical and has an open lower end and a threaded aperture 60 in its upper end. Threaded aperture 60 cooperates with threaded lower end 52 of shaft 50 to support tubular valve 54 over pan 14. Hub 58 is rotatable around bearing support 44 and vertically movable in relation thereto as it rotates around threaded end 52 of shaft 50.

A sleeve 62 is mounted to the upper end of hub 58 and extends vertically, surrounding shaft 50. Horizontal straps 64 affixed to the upper end of tank 12 extend radially inwardly to support a bearing 66 through which sleeve 62 extends. Sleeve 62 extends upwardly past bearing 66, and has a threaded aperture and set screw 68 in its upper end. Set screw 68 may be selectively tightened so as to contact shaft 50 within sleeve 62, thereby causing sleeve 62 to be rotatable with shaft 50. Shaft 50 extends slightly beyond sleeve 62, and has a handle 70 affixed thereto for rotating shaft 50 upon bearing 48.

A hollow cone 72 with an aperture 74 at its point end has slots 76 in its lower end which correspond with and receive cross beams 56. Cone 72 fits over cross beams 56 so as to protect bearing 48 from feed flowing through feeder 10. The lower end or cone 72 is slightly wider than plateau 42 such that feed is directed from funnel 18 along the sloped surface of cone 72 directly to the sloped surface of truncated conical center portion 38 of pan 14.

A shallow funnel insert 78 is mounted within valve 54 and redirects feed flowing from funnel 18 away from the side walls of valve 54 and generally perpendicularly to the truncated center portion 38. Shallow funnel insert 78 works in cooperation with cone 72 so as to dramatically reduce the force required to rotate valve 74 relative to pan 14 and tank 12. Without insert 78, it has been found that the feed rests directly on conical center portion 38 and against the inside surface of valve 54. Because of the large area of contact of feed on the non-rotatable conical portion 38, it is very difficult for animals to rotate valve 54 using projecting plate 80. Funnel insert 78 will rotate along with valve 54, and carries a large amount of the feed which would otherwise rest on conical center portion 38. Thus, the effort required to rotate valve 54 is greatly reduced, and the animals are able to easily agitate the feed within valve 54.

A removable cover 82 is hinged to the top of tank 12 and protects the feed from the weather, as well as allowing access to handle 70 on shaft 50.

In operation, pigs may reach feed within pan 14 by lifting lids 32. If bridging occurs, the pigs can rotate valve 54 by pushing on plate 80. This causes cross beam 56 to agitate feed flowing within valve assembly 16.

Set screw 68 in sleeve 62 must be tightened against shaft 50 so that shaft 50 will rotate along with valve 54 and maintain the adjusted flow rate. Since threaded end 52 will rotate along with hub 58, rotation of valve 54 by the pigs will not cause any vertical adjustment of valve 54 to occur. Thus, the feed flow cannot be accidently increased or decreased by the pigs, and will allow agitation of the feed to provide an anti-bridging effect. Because the vertical pressure of the feed within tank 12 is funneled to rest on the sloped surface of cone 72, the friction against rotation of valve 54 is greatly reduced. The further reduction of the surface area on truncated center portion 38 adjacent bottom 40 (by use of funnel insert 78) also reduces the friction against rotation of valve 54. Thus, even with the extremely large capacity of feeder 10, pigs are still able to rotate valve to agitate the feed.

In order to adjust the feed flow, set screw 68 is loosened so that sleeve 62 is not fastened to shaft 50, and is therefore rotatable around shaft 50. Handle 70 is then operated to rotate shaft 50 and thereby rotate threaded end 52 within threaded aperture 60 of hub 68. Enough friction exists by virtue of cross beams 56 within feed flowing through valve assembly 16, to hold hub 58 from rotating with shaft 50 during adjustment. Thus, valve 54 is raised or lowered relative to pan 14 to increase or decrease the feed flow.

It can therefore be seen that the invention as described above fulfills at least all of the objects stated herein.

I claim:

1. A pig feeder, comprising:
   a ground supported pan portion having a bottom and an upstanding sidewall around is perimeter;
   a tank portion mounted to said pan and positioned thereover, said tank having open upper and lower ends, whereby said tank will hold animal feed for deposit into said pan;
   selectively adjustable valve means positioned between the lower end of said tank and said pan, for regulating the flow of feed from said tank into said pan;
   said valve means including a vertically oriented hollow tube operatively mounted on said pan for rotatable and vertically-adjustable movement;
   a feed-agitating member mounted within said hollow tube for rotation therewith, and extending within said hollow tube to agitate feed and prevent bridging prior to delivery of the feed to the pan;
   an exteriorly projecting member mounted on said valve means for rotation said hollow tube and feed-agitating member;
   means for selectively, vertically adjusting said hollow tube with respect to said pan; and
   means for selectively engaging said vertical adjusting means with said hollow tube, operable between an engaged position, wherein said vertical adjusting means is inoperable and vertical adjustment of said hollow tube is prevented, and a disengaged position, wherein said vertical adjusting means is operable to vertically adjust the hollow tube with respect to the pan.

2. The pig feeder of claim 1, wherein said valve means further includes a hub having radially extending cross beams connected to said hollow tube for supporting said hollow tube, said hub rotatably supported on said plateau and connected to said vertical adjustment means for vertical adjustment with respect to said pan.

3. The pig feeder of claim 1, wherein said vertical adjustment means includes a vertically oriented shaft having its lower end rotatably supported on a bearing mounted on a plateau, the lower end of said shaft being threaded for cooperation with a threaded aperture in said hub, whereby reaction of said shaft with respect to said hub will raise and lower said hollow tube with respect to said pan.

4. The pig feeder of claim 1 further comprising a plurality of inclined rigid straps having upper inward ends, and lower outward ends, the lower outward ends of said straps being mounted on said sidewall of said pan and the upper inward ends being positioned radially inwardly therefrom and connected to the lower end of said tank, said straps supporting said tank above and generally centered over said pan; wherein the openings formed between said straps are covered with a plurality of pivotal lids hingedly connected to said tank and operable to be lifted by an animal; and wherein said straps have upright sidewalls to form a channel, said lids having downwardly projecting sidewalls which rest within the channels formed in said straps, whereby rain will be directed off said lids into said channels and thence outwardly away from the feed in said pan.

5. The pig feeder of claim 4, further comprising an inwardly directed lip along the periometer of the upper end of said pan sidewall, said lip preventing spillage of feed from the pan.

6. A pig feeder, comprising:
   a ground supported pan portion having a bottom and an upstanding sidewall around is perimeter;
   a tank portion mounted to said pan and positioned thereover, said tank having open upper and lower ends, whereby said tank will hold animal feed for deposit into said pan;
   selectively adjustable valve means positioned between the lower end of said tank and said pan, for regulating the flow of feed from said tank into said pan;
   said valve means including a vertically oriented hollow tube operative mounted on said pan for rotatable and vertically-adjustable movement;
   a feed-agitating member mounted within said hollow tube and extending within said tube to agitate feed therein;
   an exteriorly projecting member mounted on said valve means for rotating said hollow tube and feed agitating member;
   means for selectively, vertically adjusting said hollow tube with respect to said pan; and
   a truncated cone mounted centrally in said pan and within said hollow tube, said cone having an upper plateau upon which said valve means is mounted, the diameter of the lower end of said cone being substantially the same as the diameter of said hollow tube, whereby feed within said hollow tube is supported on an inclined surface immediately adjacent to the opening between the hollow tube and said pan;
   an upright conical insert seated on said cross beams and enclosing said hub, the lower end of said conical insert having a diameter greater than that of said plateau, and located directly above said plateau such that feed flowing from said tank is directed away from said hub and plateau along an inclined surface down to the inclined surface of said truncated conical center portion and thence along to the lower end of said tube;
   a shallow funnel-shaped insert mounted within said hollow tube for supporting feed within said hollow tube, said funnel insert located above the lower end of said hollow tube to reduce the buildup of feed at the opening between the hollow tube and the pan.

* * * * *